United States Patent
Cheinet

(10) Patent No.: US 9,259,028 B2
(45) Date of Patent: Feb. 16, 2016

(54) CONTINUOUS TREATMENT SYSTEM FOR THE DEBACTERIZATION OF DIVIDED SOLIDS, ESPECIALLY FOOD PRODUCTS

(75) Inventor: Florent Cheinet, Beauchastel (FR)

(73) Assignee: FCD, Beauchastel (FR)

( * ) Notice: Subject to any disclaimer, the term of this patent is extended or adjusted under 35 U.S.C. 154(b) by 200 days.

(21) Appl. No.: 13/988,727

(22) PCT Filed: Oct. 13, 2011

(86) PCT No.: PCT/FR2011/052384
§ 371 (c)(1),
(2), (4) Date: Jul. 29, 2013

(87) PCT Pub. No.: WO2012/069720
PCT Pub. Date: May 31, 2012

(65) Prior Publication Data
US 2013/0298780 A1   Nov. 14, 2013

(30) Foreign Application Priority Data
Nov. 23, 2010 (FR) ..................... 10 59627

(51) Int. Cl.
| | |
|---|---|
| A23L 3/18 | (2006.01) |
| A23L 3/20 | (2006.01) |
| A23B 7/005 | (2006.01) |
| A23B 7/02 | (2006.01) |
| A23B 9/02 | (2006.01) |
| A23L 3/36 | (2006.01) |
| A23L 3/40 | (2006.01) |
| F26B 17/00 | (2006.01) |
| F26B 17/26 | (2006.01) |

(52) U.S. Cl.
CPC ............... *A23L 3/18* (2013.01); *A23B 7/0053* (2013.01); *A23B 7/0205* (2013.01); *A23B 9/025* (2013.01); *A23L 3/185* (2013.01); *A23L 3/20* (2013.01); *A23L 3/361* (2013.01); *A23L 3/40* (2013.01); *F26B 17/001* (2013.01); *F26B 17/26* (2013.01)

(58) Field of Classification Search
CPC .............. B02B 5/00; B02B 3/12; A23L 3/00; A23L 3/16; A23L 3/165; A23L 3/20; A23L 3/18
USPC ............ 99/471, 477, 474, 473, 488, 483, 451
See application file for complete search history.

(56) References Cited

U.S. PATENT DOCUMENTS

| | | | |
|---|---|---|---|
| 3,742,614 A | 7/1973 | Bettermann et al. | |
| 4,112,836 A * | 9/1978 | Witte ........................ | 99/483 |

(Continued)

FOREIGN PATENT DOCUMENTS

| | | |
|---|---|---|
| DE | 22 43 670 A1 | 3/1974 |
| WO | WO 91/09532 A1 | 7/1991 |

*Primary Examiner* — Reginald L Alexander
(74) *Attorney, Agent, or Firm* — Patterson Thuente Pedersen, P.A.

(57) ABSTRACT

A continuous system for the heat treatment of divided solids, combined with a gas-solid reaction for the debacterization especially of food products, such as herbs, spices, powders. The system includes a unit for supplying the product a debacterization unit having a fluidized bed moving the particles by means of vibration associated with a feed of steam or other gas, a cooling drying unit, and a packaging unit. The debacterization unit comprises a vibro-fluidized stepped bed for enabling the transport of the product that is carried out successively according to a generally horizontal first transport phase, and at least one second vertical transport phase during which steam or another gas is injected, acting in such a way as to decontaminate the product as it moves from the horizontal phase to the vertical phase and to the following horizontal phase.

3 Claims, 3 Drawing Sheets

(56) References Cited

U.S. PATENT DOCUMENTS

| | | | |
|---|---|---|---|
| 4,255,459 A * | 3/1981 | Glen | 426/521 |
| 4,844,933 A * | 7/1989 | Hsieh et al. | 426/521 |
| 4,962,700 A * | 10/1990 | Skobic et al. | 99/470 |
| 5,024,145 A * | 6/1991 | Bailey et al. | 99/451 |
| 5,305,535 A * | 4/1994 | Ritter | 34/164 |
| 8,109,209 B2 * | 2/2012 | Dieckmann et al. | 99/468 |

* cited by examiner

CONTINUOUS TREATMENT SYSTEM FOR THE DEBACTERIZATION OF DIVIDED SOLIDS, ESPECIALLY FOOD PRODUCTS

RELATED APPLICATIONS

The present application is a National Phase entry of PCT Application No. PCT/FR2011/052384 filed Oct. 13, 2011, which application claims the benefit of priority to FR Patent Application No. 1059627, filed Nov. 23, 2010, the entire disclosures of which are incorporated herein by reference.

TECHNICAL FIELD

This invention relates to a continuous system for the heat treatment of divided solids combined with a gas-solid reaction having for main application the decontamination of divided solids, in particular of food products, such as herbs, spices, powders etc.

BACKGROUND ART

By way of example, currently the demand for decontaminated food products is increasingly higher, as demonstrated by the recalls of products contaminated with listeria, and the costs generated are often enormous.

The cost for obtaining quality is currently a hindrance that European Community regulations are in the process of correcting by requiring increasingly substantial guarantees.

Being able to propose "pasteurized" products instead of "sterile" or at least "decontaminated" has become a requirement in the worldwide market.

The targets are: enterobacteria of the *Escherichia Coli* type, total flora, yeasts and molds.

In the production method, the major actors in the market are for the moment still in "westernized" countries. They purchase herbs and spices produced in the various countries of the world, and the latter, often contaminated, must then be "debacterized". Indeed, the steps of drying are often carried out directly on the ground in some countries, for economical reasons.

Currently, there are various technologies available on the market that make it possible to decontaminate the products in various forms.

Irradiation, microwaves, ionization, ozone, gases of the polypropylene oxide type, depositing decontaminating substances, generally speaking all of the solutions other than water vapor are not solutions that have a future, for the moment, because they are subject to specific markings on the final packaging which is a genuine hindrance to marketing (a product decontaminated via irradiation is harder to sell).

Other systems using steam are differentiated into two sub-categories:

"batch" systems of the autoclave type: batches are treated unitarily, which allows for perfect traceability but which requires high manpower costs. These systems are used extensively in the pharmaceutical industry.

Continuous systems.

The fundamental parameters in decontamination via steam are:

The temperature of the product
The method of transport of the product
The temperature of the steam
The passage time of the product
The quantity of steam used Indeed, a passage time of a few seconds at a high temperature can have the same effect as a time of 3 minutes at a lower temperature. But the product can be altered by the temperature. The quantity of steam used will remove essential oils and flavorings from the product, which alters the final quality of the product in terms of color as well as taste.

The method of transport of the divided solids and the method of treatment and heating greatly affect the cost of the installation, the quality of the treatment and the quality of the final product.

The compromise between what the customer can accept in terms of color, taste, and the level of contamination with regards to the cost of the treatment provides the technical-economical compromise to be found.

Decontamination must be as thorough as possible, in such a way as to achieve the acceptable levels of contamination, without degrading or destroying the organoleptic characteristics of the products, having the smallest possible degree of alteration of the products in terms of color and taste; using the most economical method of heating possible and a method of transport which makes it possible to satisfy all of these imperatives.

A continuous decontamination unit is comprised of a product supply, a debacterization unit, a cooling drying unit and a packaging unit.

The system for supplying the product is often an option available to the users.

The debacterization via steam portion obviously requires steam. A boiler to produce this steam is an option that few users choose; indeed industrialists in the agro-foods industry are generally equipped with steam in their factories. However, vigilance must be taken concerning the fact that a unit requires regulated steam and also often superheated between 100 and 140° C. This implies an option with a superheater.

Then, also, the portion concerning extracting the steam to the exterior must also be provided. The latter will in general also be used for extracting the cold and dry air used in the cooling portion which reduces issues concerning condensation.

Customers often have in their factories extractions systems nearby that they can connect to.

When the product exits the debacterization unit it is hot and wet. So that it is not immediately recontaminated by the air it is imperative to dry it and cool it.

The product is then brought to the cooling-drying unit.

That is why having cold, dry and filtered (not contaminated) air is required and often the users are equipped with this. These installations are very expensive and greatly affect the cost of the installation.

The cost largely depends on the demand from the user: what temperature of the product in relation to the exterior temperature can be accepted at the exit of cooling, keeping in mind that the last 5° C. are the most difficult to obtain and that the difference in relation to the ambient conditions is often substantial (in Malaysia, the temperature is 30° C. and the humidity is 95%, in Greece 35° C. and very dry. The imperatives are different).

When the product is dry, debacterized and at a temperature which allows it to be packaged without immediate recontamination it is stored or packaged. A "big bag" bagging system, simple and inexpensive, is a commonly proposed option.

The main systems known on the market consist in creating:

a fluidized bed (transport by vibrations) moving the particles on a metal plate pierced with a multitude of holes and the steam is used to heat the particles and debacterize them.

Advantages: high degree of homogeneity of the treatment and possibility of treating all the sizes of particles but the price of the installation is very expensive and there is a lot of steam which substantially degrades the products.

A system is also known that consists in using a stainless steel tube wrapped as a spiral around a tower heated via the Joule effect, with this tower subjected to a vibration which makes it possible to raise the product. Steam is injected from one side of the spires and extracted from the other.

Advantages: approximately 10 times less steam is needed than previously because the particles are heated by contact on the tube, the steam is used only for the debacterization. But the disadvantage resides in the very high price for small capacities because this makes use of electrical power, powders are not sufficiently decontaminated, caking at the input and output i.e. in the cold zones, and the vibro-fluidized bed of the tube does not guarantee homogeneity of the treatment.

A third known system consists in using a worm screw in a trough, with both heated by the Joule effect, the screw causes the product to move forward. Steam is injected all along the trough, in order to decontaminate the product.

Advantages: approximately 10 times less steam than in the first case as the particles are heated by contact with the screw and the trough, but the price of the installation is substantially affected by the electrical power. The space between the trough and the screw leaves a bed of untreated product which limits the effectiveness of the treatment by not guaranteeing its homogeneity.

The study of concurrent systems shows that electrical power should not be used which requires the use of expensive electrical transformers.

The transport system must not be carried out by a screw as it does not guarantee homogeneity for the treatment.

The vibrating tower is too expensive to be used as such.

The particles have to be heated (before debacterization) other than with steam otherwise the products are degraded.

In fact:

The transport must be carried out via a "converted" fluidized bed.

The steam has to be superheated in order to decontaminate faster

The heating of the fluidized bed shall be carried out by off-the-shelf electrical resistances.

The system must be able to treat all particle sizes including powders.

SUMMARY OF THE INVENTION

With this purpose and in order to overcome the disadvantages of the existing systems, embodiments of this invention relate to a continuous system for the heat treatment of divided solids, combined with a gas-solid reaction for the debacterization in particular of food products, such as herbs, spices, powders etc. of the type comprised of:

a unit for supplying the product, a debacterization unit comprised of a fluidized bed moving the particles by means of vibration, associated with a feed of steam or other gas, a cooling-drying unit, a packaging unit, characterized in that the debacterization unit comprises a stepped bed for enabling the transport of the product (6) that is carried out successively according to a generally horizontal first transport phase, vibro-fluidized, and at least one second vertical transport phase, these stepped phases, being obtained using a generally horizontal and solid step forming the bed providing the first phase, while a vertical riser provides the second phase, said riser or the nosing of the step having a bar for injecting superheated steam or other gas, acting in such a way as to decontaminate the product as it moves from the horizontal phase to the vertical phase and to the following horizontal phase.

Embodiments of the invention also relate to the characteristics that will become clear in the following description, and which shall be taken separately or according to combinations technically permissible.

BRIEF DESCRIPTION OF THE DRAWINGS

This description provided by way of a non-restricting example, will provide a better understanding of how the invention can be carried out in reference to the annexed drawings wherein.

DETAILED DESCRIPTION

Figure 1:
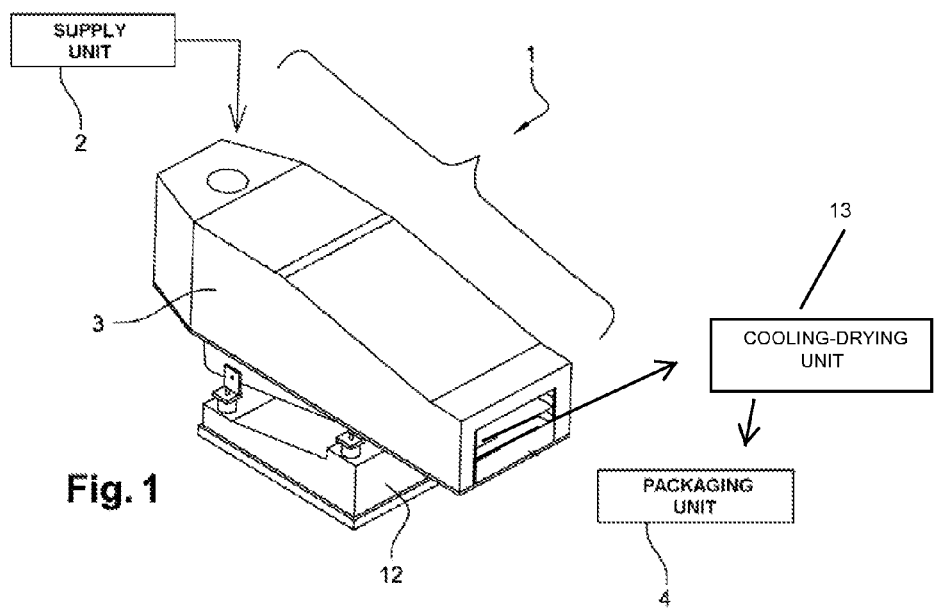
FIG. 1 diagrammatically and in perspective shows a continuous system for decontamination incorporating a debacterization unit according to an embodiment of the invention.
Figure 2:
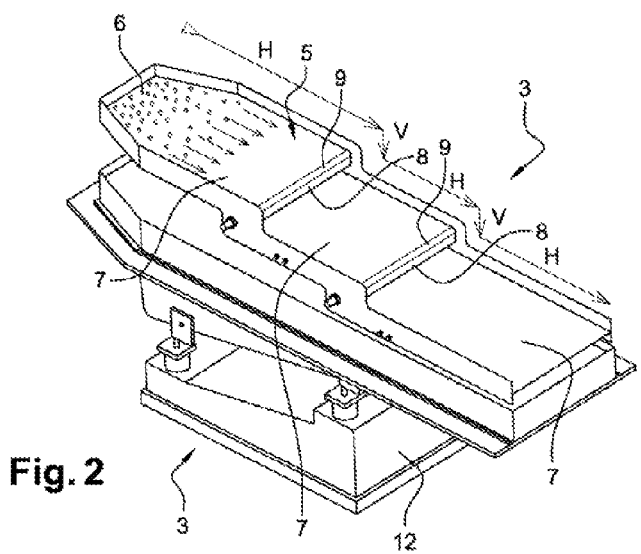
FIG. 2 shows in perspective a debacterization unit according to FIG. 1, without a protective cover in order to provide a better understanding.
Figure 3:
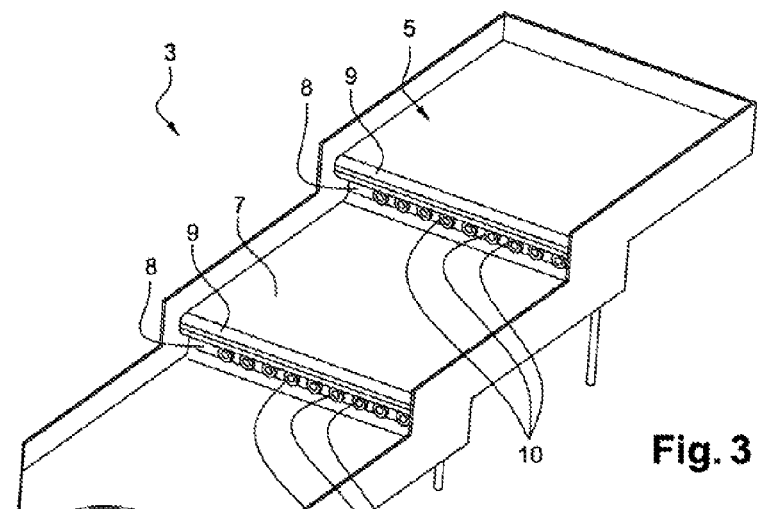
FIGS. 3 and 4 show in perspective a single bed, constitutive of the debacterization unit respectively as a top view and a bottom view.
Figure 4:
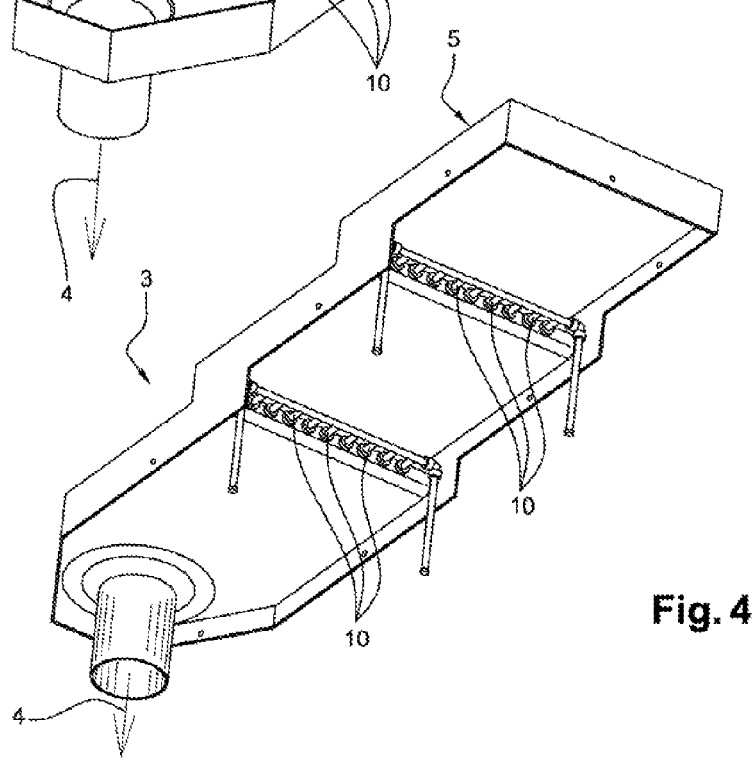

The decontamination system 1, shown globally in FIG. 1 comprises in a known manner:

a unit for supplying 2 the product;

a debacterization unit 3 comprised of a fluidized bed moving the particles by means of vibration, associated with a feed of steam or other gas;

a cooling drying unit, a packaging unit 4

According to the invention the debacterization unit 3 comprises a stepped bed 5 for enabling the transport of the product 6 that is carried out successively according to a generally horizontal first transport phase H, vibro-fluidized, and at least one second vertical transport phase V, these stepped phases H, V being obtained, using a generally horizontal and solid step 7, forming the bed 5 providing the first phase H, while a vertical riser 8 provides the second phase V, the riser 8 or nosing 9 of the step 7 having a bar 10 for injecting superheated steam or other gas, acting in such a way as to decontaminate the product 6 as it moves from the horizontal phase H to the vertical phase V and to the following horizontal phase H.

The gas-solid reaction is initiated in the first vertical phase on the product that is already heated. This vertical phase provides homogeneity in the treatment over 100% of the particles. The reaction continues with the following horizontal phase since the vibro-fluidized bed continues to react with the gaseous phase. The process is continuous and lasts over the entire length of the debacterization unit. In the specific case with debacterization the gas used will be water vapor (generally superheated).

The stepped bed 5 comprises at least two steps 7 and a riser 8, but of course this is not limited and can vary according to the nature and the quantity of product 6 to be treated, it is as such by way of an example embodiment the bed shown in the figures includes three steps 7 and two risers 8.

Figure 5:
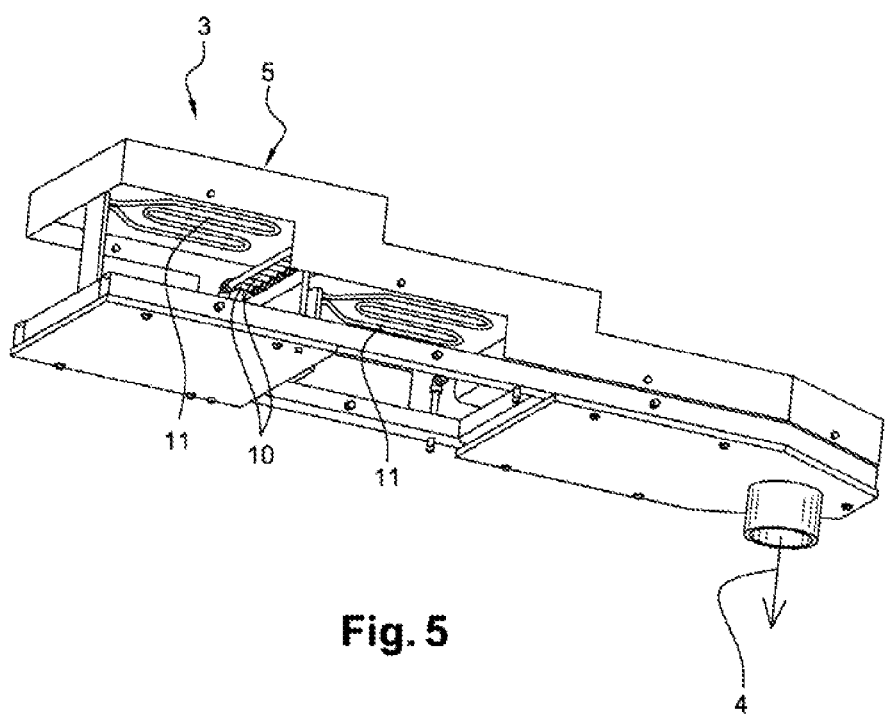
FIG. 5 shows in perspective the bed as a bottom view according to FIG. 4, but showing an integrated electrical heating circuit.

According to another characteristic of embodiments of the invention (see FIG. 5), the bed 5 comprises under the lower surface of its solid steps 7 the electrical resistances 11, able to heat beforehand by contact the product 6 before the passing in front of the bar 10 for injecting steam or other gas, the riser 8 or the step nosing 9. This heating beforehand makes it possible to prevent the risks of condensation of steam (or other gas) and limits the quantity of steam (or other gas) to be used.

The steps 7 of the stepped bed 5 can be inclined until plus or minus 30° in relation to the horizontal.

Testing and know-how will determine the length of the steps 7, the height of the risers 8, the shape of the step nosing 9, the number of steps 7, the number of points for steam injection 10, the type of the injection nozzles, which are according to the products to be sterilized.

The vibrations of the bed 5 are obtained by the intermediary of a vibrating electromagnetic motor 12, an unbalanced motor, or an unbalanced box according to the products.

The advantages of a decontamination unit according to embodiments of the invention reside first of all in the low prices for carrying them out, and the homogeneity of the treatment, as the vertical phase ensures that all of the particles of the products pass through the flow of steam or gas, of the injection bar 10, while they are in suspension and therefore without contact with the bed, ensuring the mixing.

In fact, the system according to embodiments of the invention makes it possible to thermally treat divided solids, i.e. making it possible to treat particles from two microns to several centimeters. It makes it possible to cause divided solids to react with a gas. This is a major advantage which is the ensuror of a very high degree of versatility which is highly sought by users who treat several products, of different sizes, densities, etc.

The great simplicity of the system also procures the advantage of making it easy and quick to maintain, excluding any use of consumable items.

Also of note:

The size of the installation can be adjusted according to the capacity required for the width and the time of passage for the length, but a length of 6 to 8 m would provide for a time of passage of 3 minutes and 30 seconds which is a standard in the profession.

The electrical energy for the resistances in order to heat the bed from underneath is required, which is a hindrance in countries where the current is unstable, a solution with a double shell with an oil bath could be considered, but would provide challenges with vibrating systems.

The invention claimed is:

1. A continuous system for the heat treatment of divided solids, combined with a gas-solid reaction for the debacterization in particular food products, such as herbs, spices, powders and the like, comprising:
   a unit for supplying the product,
   a debacterization unit including a fluidized bed moving the particles by means of vibration, associated with a feed of steam or other gas,
   a cooling drying unit,
   a packaging unit,
   the debacterization unit including a stepped bed for enabling the transport of the product that is carried out successively according to a generally horizontal first transport phase, vibro-fluidized, and at least one vertical second transport phase, said generally horizontal first transport phase and said at least one vertical second transport phase using a generally horizontal and solid step forming the bed providing said generally horizontal first transport phase, while a vertical riser provides said at least one vertical second transport phase, said riser, or nosing of said riser, of said generally horizontal and solid step having a bar for injecting steam or other gas, acting in such a way as to decontaminate the product as it moves from said generally horizontal first transport phase to said at least one vertical second transport phase and to the following horizontal phase, and wherein the stepped bed comprises under the lower surface of its solid steps, electrical resistances, able to heat beforehand by contact, the product before the passing in front of the bar for injecting steam or other gas, the riser or the nosing of said riser.

2. System according to claim 1 wherein the stepped bed comprises at least two steps and a riser.

3. System according to claim 1 wherein the steps of the stepped bed are inclined plus or minus 30° in relation to the horizontal.

* * * * *